(12) United States Patent
Rao et al.

(10) Patent No.: US 11,748,491 B1
(45) Date of Patent: Sep. 5, 2023

(54) DETERMINING PLATFORM-SPECIFIC END-TO-END SECURITY VULNERABILITIES FOR A SOFTWARE APPLICATION VIA A GRAPHICAL USER INTERFACE (GUI) SYSTEMS AND METHODS

(71) Applicant: Citibank, N.A., New York, NY (US)

(72) Inventors: Prithvi Narayana Rao, Allen, TX (US); Pramod Goyal, Ahmedabad (IN)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/098,895

(22) Filed: Jan. 19, 2023

(51) Int. Cl.
G06F 21/57 (2013.01)
G06F 21/55 (2013.01)

(52) U.S. Cl.
CPC .......... *G06F 21/577* (2013.01); *G06F 21/552* (2013.01)

(58) Field of Classification Search
CPC .............................. G06F 21/577; G06F 21/552
See application file for complete search history.

(56) References Cited

U.S. PATENT DOCUMENTS

| | | | | |
|---|---|---|---|---|
| 2014/0137257 A1* | 5/2014 | Martinez | ............. | H04L 63/1433 726/25 |
| 2017/0061132 A1* | 3/2017 | Hovor | ................. | H04L 63/1433 |
| 2017/0295197 A1* | 10/2017 | Parimi | .................... | H04L 63/10 |
| 2019/0286816 A1* | 9/2019 | Fu | .......................... | G06F 21/552 |
| 2020/0012493 A1 | 1/2020 | Sagy | | |
| 2020/0314191 A1 | 10/2020 | Madhavan et al. | | |
| 2021/0211431 A1* | 7/2021 | Albero | ................... | G06F 21/552 |
| 2021/0273957 A1* | 9/2021 | Boyer | ................. | H04L 63/1416 |
| 2022/0114251 A1* | 4/2022 | Guim Bernat | ...... | H04L 43/0823 |
| 2022/0147636 A1* | 5/2022 | Mahuli | ................. | G06F 21/577 |
| 2023/0032686 A1* | 2/2023 | Williams | ............... | H04L 67/10 |
| 2023/0052608 A1* | 2/2023 | Wattiau | ................. | H04L 9/3271 |
| 2023/0067128 A1* | 3/2023 | Engelberg | ........... | H04L 63/1433 |
| 2023/0071264 A1* | 3/2023 | Hakala | .................. | G06F 21/554 |
| 2023/0076372 A1* | 3/2023 | Engelberg | .......... | H04L 63/1433 |
| 2023/0077527 A1* | 3/2023 | Sarkar | ................. | H04L 63/1433 705/7.28 |
| 2023/0114719 A1* | 4/2023 | Thomas | .................. | H04L 63/20 726/22 |
| 2023/0117962 A1* | 4/2023 | Kaimal | ................. | H04L 9/0891 726/1 |

(Continued)

*Primary Examiner* — Stephen T Gundry
(74) *Attorney, Agent, or Firm* — Perkins Coie LLP

(57) ABSTRACT

Systems and methods for determining and displaying platform-specific end-to-end security vulnerabilities via a graphical user interface (GUI) are disclosed. To provide users with visual indications of vulnerable computing aspects associated with a computing platform, the system identifies computing aspects associated with a platform. The system then obtains from a security entity, security-vulnerability descriptions that are associated with the platform. Using the security-vulnerability descriptions, the system then determines threat levels for each security-vulnerability description and then, using the determined threat levels, determines a computing aspect impact level for each computing aspect associated with the platform. The system then generates for display on a GUI, a graphical layout comprising each computing aspect impact level for each computing aspect associated with the platform.

18 Claims, 7 Drawing Sheets

(56) References Cited

U.S. PATENT DOCUMENTS

| | | | |
|---|---|---|---|
| 2023/0118388 A1* | 4/2023 | Crabtree | H04L 63/123 726/23 |
| 2023/0123314 A1* | 4/2023 | Crabtree | H04L 9/0643 726/22 |
| 2023/0132703 A1* | 5/2023 | Marsenic | H04L 63/20 726/25 |
| 2023/0135660 A1* | 5/2023 | Chapman | G06Q 10/063114 705/7.38 |

* cited by examiner

DETERMINING PLATFORM-SPECIFIC END-TO-END SECURITY VULNERABILITIES FOR A SOFTWARE APPLICATION VIA A GRAPHICAL USER INTERFACE (GUI) SYSTEMS AND METHODS

BACKGROUND

When determining whether a software application is secure (e.g., safe to use), software developers often rely on publicly available information related to specific hardware components and software components that may indicate whether a security vulnerability exists. However, such publicly available information may be too generic to accurately determine whether a given software application is impacted by a particular security vulnerability. For example, the publicly available information may not be specific to a platform or platforms that a given software application may be associated with. Moreover, the publicly available information may be insufficient as the generic nature of the information does not account for the custom architecture of a given platform of computing system. For example, the publicly available information cannot provide information related to how a security protocol of one software application may interfere with the security protocol of another software application, leading to one or more undetected security vulnerabilities. Software developers employing manual techniques to determine whether the given software application is impacted by one or more security vulnerabilities often leads to errors and is based on subjective opinion of the developer/reviewer. Moreover, changes to publicly available information take time to be propagated with existing systems because they often require manual updates and integration. As such, existing systems could be utilizing stale data and providing out-of-date trust indications. Additionally, end-users may not be knowledgeable enough to accurately determine whether the software application they are using is secure due to the complex cybersecurity jargon and other complex information included in security vulnerability descriptions. Moreover, existing systems do not provide any mechanism to enable end-users to evaluate security vulnerabilities in real-time when a software application is being deployed (e.g., executed, implemented, etc.). This can result in data breaches as a security vulnerability may exist that the software developer or end-user is not able to accurately determine. These and other drawbacks exist.

Figure 1:
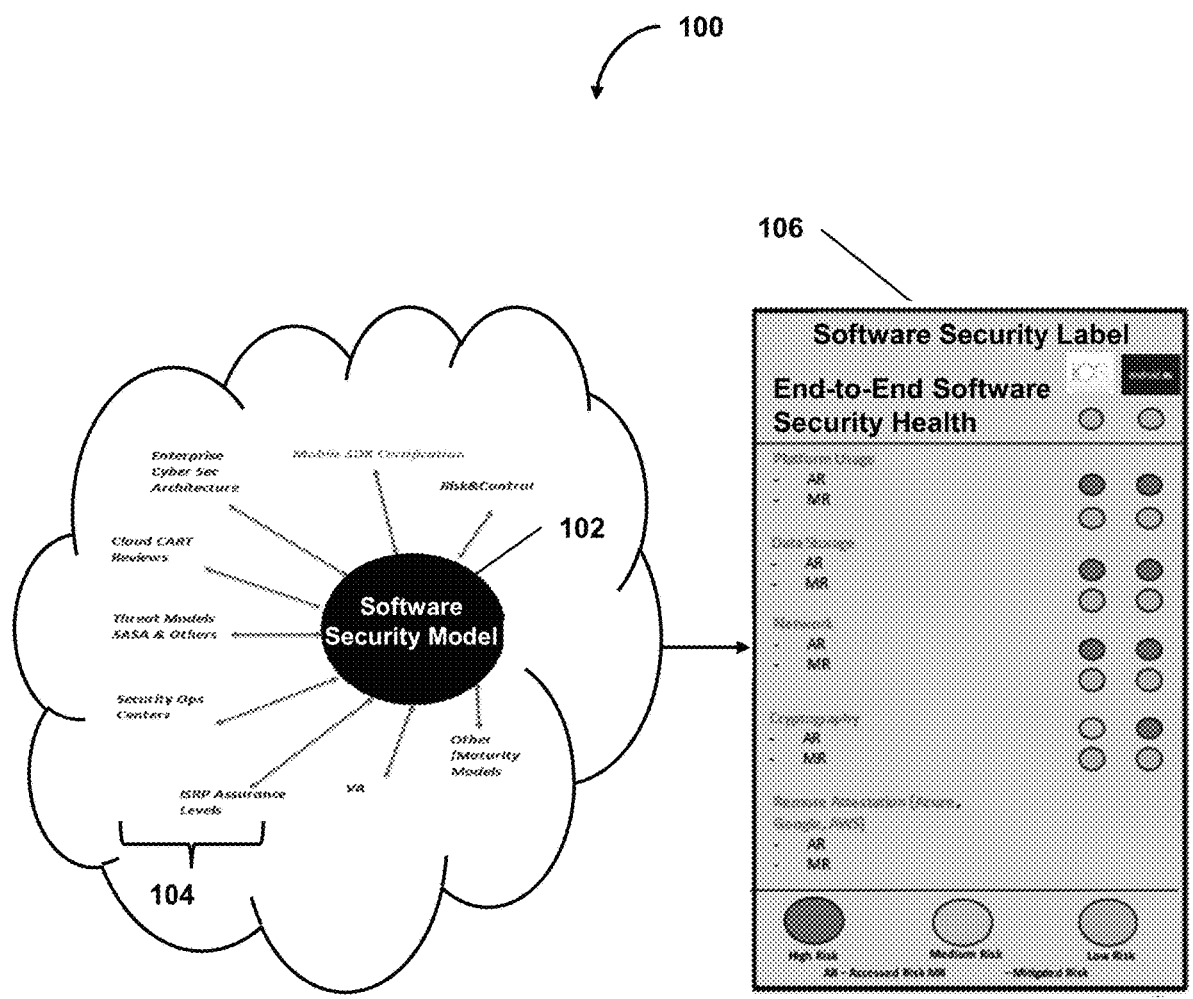
FIG. 1 is an illustrative diagram showing an illustration of a logical component used to determine platform-specific end-to-end security vulnerabilities for a software application and a graphical layout for displaying the platform-specific end-to-end security vulnerabilities for the software application via a Graphical User Interface (GUI), in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, etc.) does not include security vulnerabilities that may make the user's sensitive data prone to a data leak, man-in-the-middle attack, or other security vulnerabilities/attacks. However, as malicious entities continue to test these software applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time. Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

For example, due to the sheer amount of variations of software applications, the platforms software applications may be executed on, the hardware and software components that control or are otherwise associated with functions related to the software application, and security vulnerabilities that are known to exist amongst the hardware components, software components, and the platform, there is a large amount of time spent attempting to identify how respective computing aspects are impacted by these complex combinations which are also prone to errors as software developers use their mere opinion to determine which aspects are impacted. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

In various implementations, the methods and systems described herein can generate an improved graphical layout indicating computing-aspect-specific impact levels (e.g., as related to a software application and the platform the software application is being executed on) to indicate to an end-user whether the software application is safe to use. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability descriptions by using a platform-specific policy that indicates security impact information related to the security-vulnerability descriptions. Computing aspect impact levels for each computing aspect associated with the platform can be determined using the determined threat value for each security-vulnerability description. A graphical layout can then be displayed at a user interface, where the graphical layout comprises a graphical representation of each computing aspect impact level of each respective computing aspect of the set of computing aspects associated with the platform.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application- and/or processing-related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third-parties (e.g., third-party security entities). Such third-party data sources may represent industry trusted globally-accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
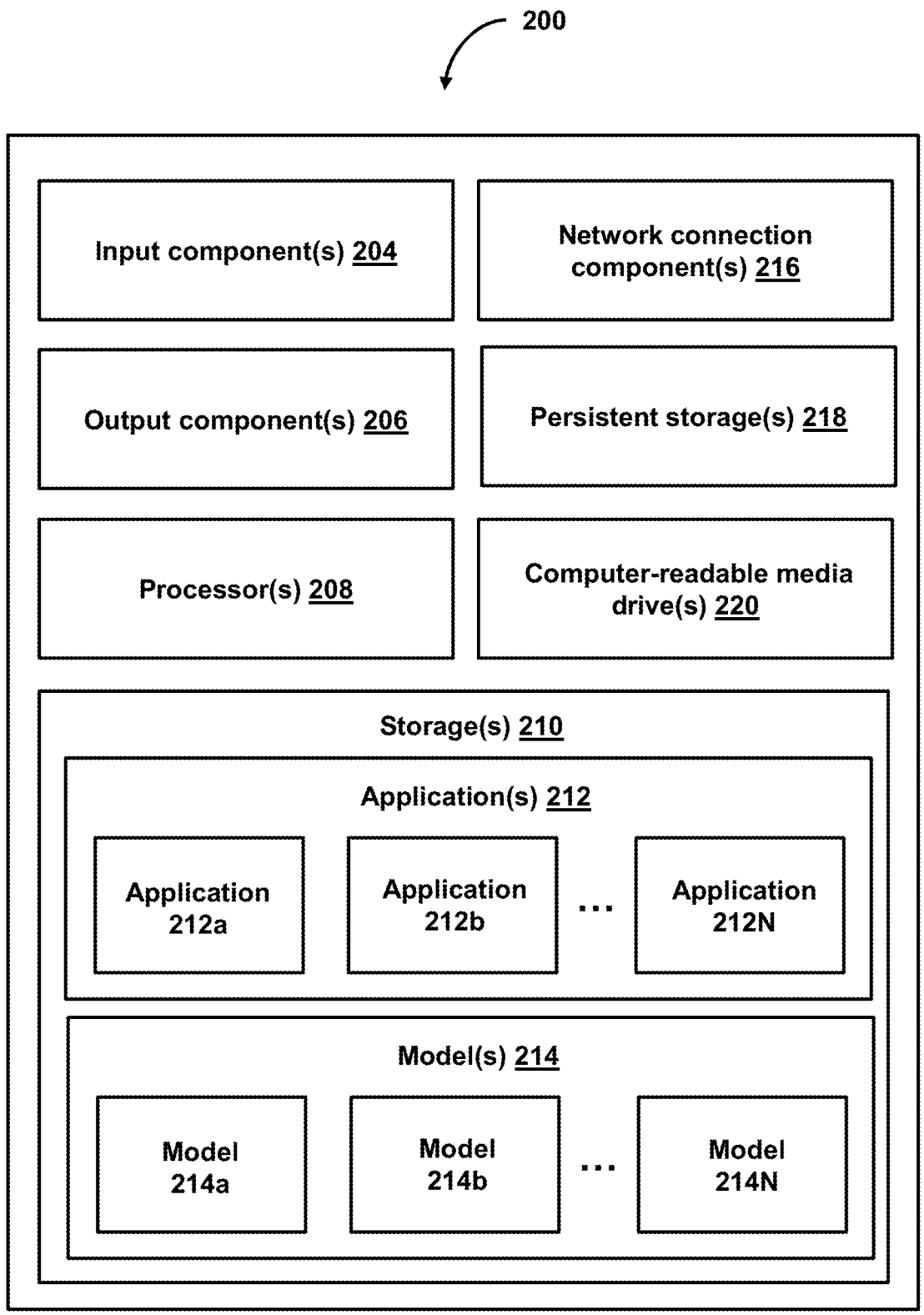
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214), and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD—ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
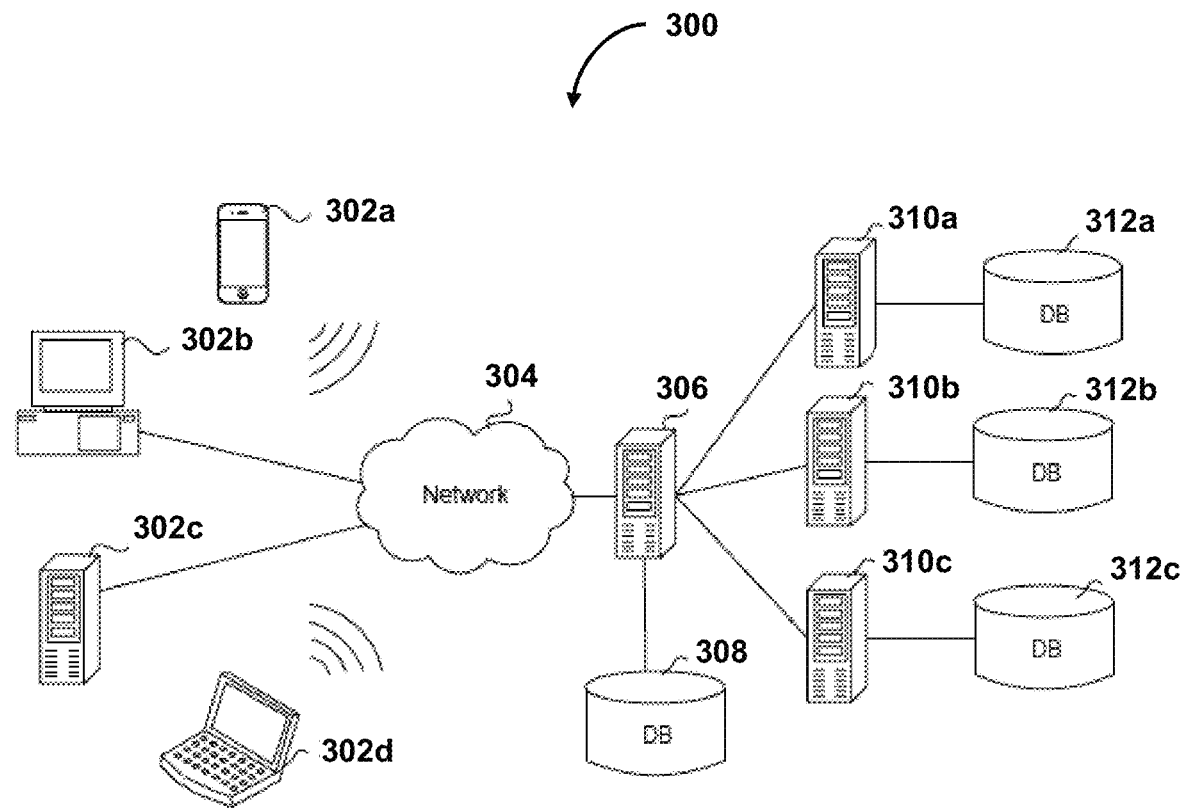
FIG. 3 is a system diagram illustrating an example of a computing environment in which the disclosed system operates in some implementations of the present technology.

FIG. 3 is a system diagram illustrating an example of a computing environment in which the disclosed system operates in some implementation. In some implementations, environment 300 includes one or more client computing devices 302a-d, examples of which can host the system 100. For example, the computing devices 302a-d can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310a-c. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310a-c) connect to a corresponding database (308, 312a-c). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry standard scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
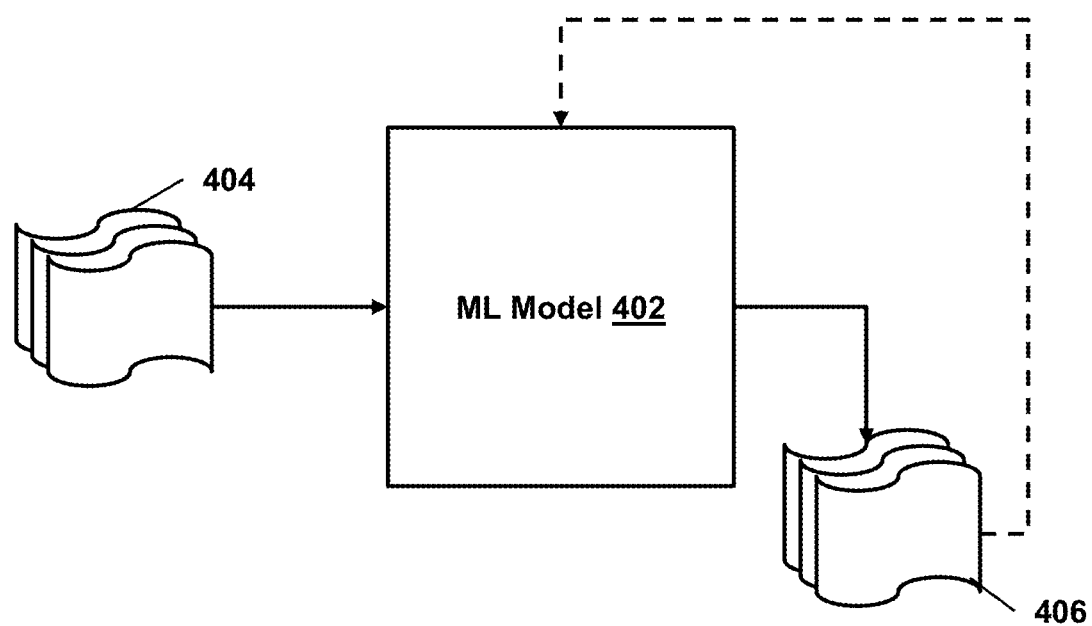
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include a platform identifiers, security vulnerability descriptions, one or more computing aspects, or other information. For example, the platform identifiers may indicate a respective platform that a software application is associated with (e.g., cloud-based application, mobile application, operating system, an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some embodiments, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include a platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lover weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include a platform identifiers, security vulnerability descriptions, one or more computing aspects, a platform-specific policy, one or more impact level measures, or other information. As an example, the one or more impact level measures may indicate how to "measure" or otherwise "generate" an computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The third set of information can include a platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted, that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some embodiments, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be a qualitative values, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g. input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some embodiments, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

Determining Security Vulnerabilities via Network Operation Routes

Figure 5:
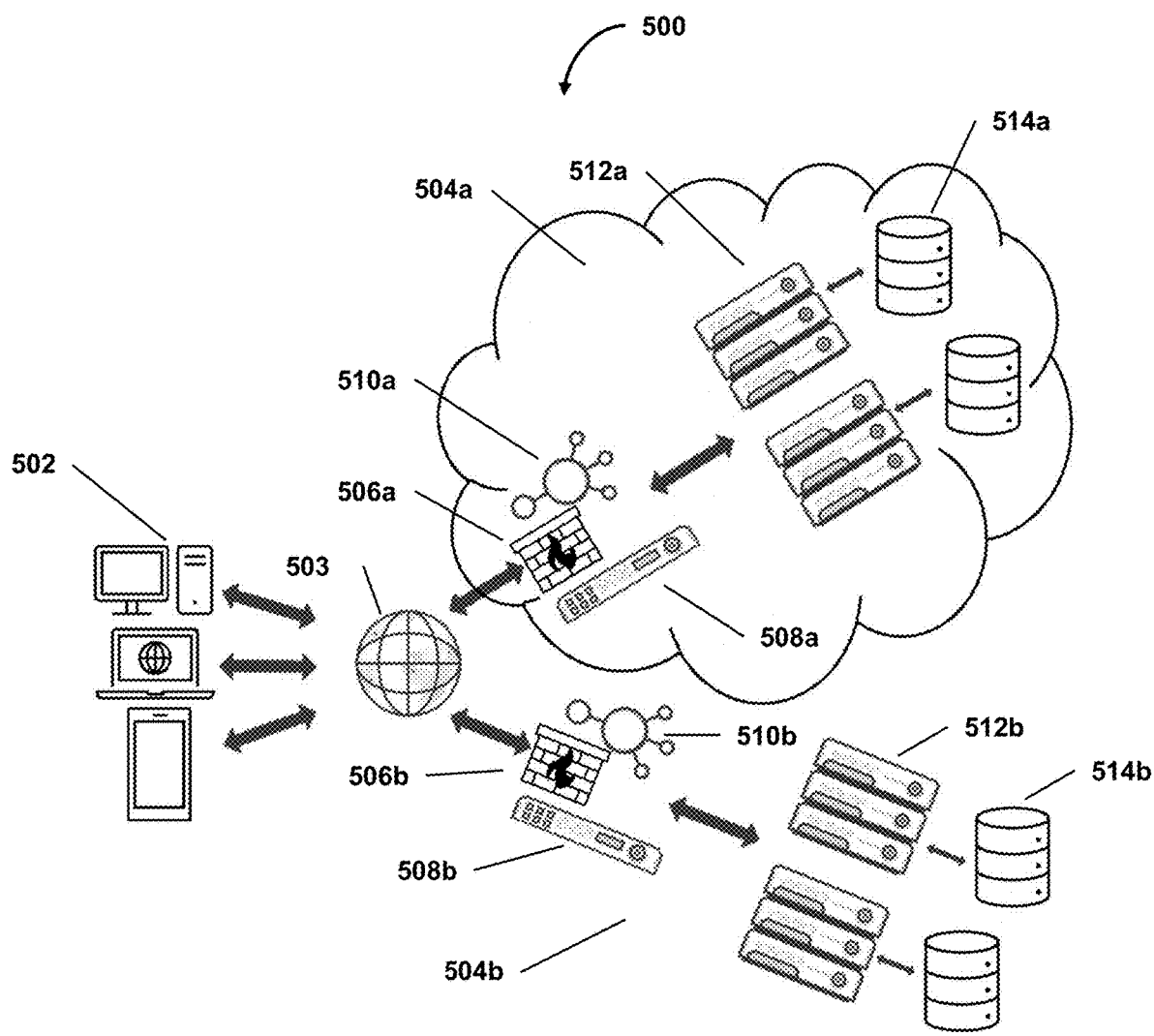
FIG. 5 shows an exemplary system for determining security vulnerabilities based on a network route for a network operation, in accordance with some implementations of the present technology.

FIG. 5 shows an exemplary system 500 for determining security vulnerabilities based on a network route for a network operation, in accordance with some implementations of the present technology.

To determine whether a software application is safe to use or is a secure application, in some implementations, it is advantageous to determine each platform that the software application is associated with. For instance, to determine platform-specific end-to-end security vulnerabilities based on a network route for a network operation, a mobile application (e.g., mobile application-based platform) may interact with a cloud-based platform as well as a third-party platform to process data related to a specific request, such as executing a computer program instruction. As referred to herein, a network operation can indicate a transmission of data over one or more computing networks, computing components, or computing systems. For instance, a network operation can be a request for information, a transmission of information, or other computing-related operations. As an example, with respect to FIG. 5, a user can interact with user device 502. To execute a request, such as logging into an entity's computing system to gain access to one or more resources (e.g., account details, account balance, user profile settings, etc.), the user device 502 may transmit a request over network 503 which may then be relayed amongst cloud-based platform 504a to gain access to the entity's computing system. For instance, cloud-based platform 504a may include a cloud-based firewall 506a, a cloud-based software load balancer 510a, a cloud-based hardware load balancer 508a executing the cloud-based software load balancer 510a, one or more cloud-based servers 512a and one or more cloud-based databases 514a. Each of cloud-based firewall 506a, cloud-based software load balancer 510a, cloud-based hardware load balancer 508a executing the cloud-based software load balancer 510a, cloud-based servers 512a and cloud-based databases 514a may be impacted (or otherwise associated) with one or more platform-specific security vulnerabilities. For example cloud-based platform 504a can be associated with security vulnerabilities that can impact one or more computing aspects associated with the cloud-based platform with respect to the software application and third-party based platform 504b can be associated with a different set of security vulnerabilities that may impact one or more computing aspects associated with the third-party based platform with respect to the software application. Furthermore, as the login request is relayed through each one of those components, which can indicate a network route for the network operation of logging in, each security vulnerability can be examined to determine whether a computing-aspect is or is not impacted by the security vulnerabilities related to the platform, the software, and the hardware combinations along the network route. In this way, by determining each "component" that a network operation may interact with during a processing of a network operation, the system can accurately determine the secureness (or alternatively) the safety of the mobile application and it associated platform interactions to prevent data breaches.

In some implementations, a network processing route can include one or more network processing sub-routes. A network processing sub-route can be an interaction with one or more computing systems, computing software, or computing hardware components that enable the execution (or processing) of a network operation. A set of network processing sub-routes can comprise an overall network processing route. For example, where a network operation is a request to store an image from a third-party based platform 504b to the cloud-based platform 504a, the user device 502 may transmit a request over network 503 to (i) obtain an image from third-party database 514b and (ii) store the image in cloud-based database 514a. However, to execute such a request, the network processing route may then include a data flow from the user device 502 to network 503, then from network 503 to third-party firewall 506b, to third-party software load balancer 510b, to third-party hardware load balancer 508b, to third-party server 512b, to third-party database 514b to obtain the image. The obtained image can then be transferred back through each of third-party server 512b, to third-party hardware load balancer 508b, to third-party software load balancer 510b, third-party firewall 506b, and network 503. Lastly, to store the image on cloud-based database 514*a*, the obtained image may then be transmitted through each of cloud-based firewall 506*a*, cloud-based software load balancer 510*a*, cloud-based hardware load balancer 508*a* executing the cloud-based software load balancer 510*a*, cloud-based servers 512*a*, and cloud-based databases 514*a* to store the image. As such, although the mobile-application being executed on the user device is separate from cloud-based system and the third-party system, the mobile-application may interact with each, and therefore, security vulnerabilities for each component must be analyzed to generate an accurate end-to-end software security label.

In some implementations, upon determining a network processing route for a network operation, the system can determine each hardware component, software component, and platform that is associated with a given network operation. Using such information, the system may provide the hardware component, software component, and platform information to one or more machine learning models to determine computing-aspect impact levels and generate an end-to-end software security label for a software application.

Figure 6:
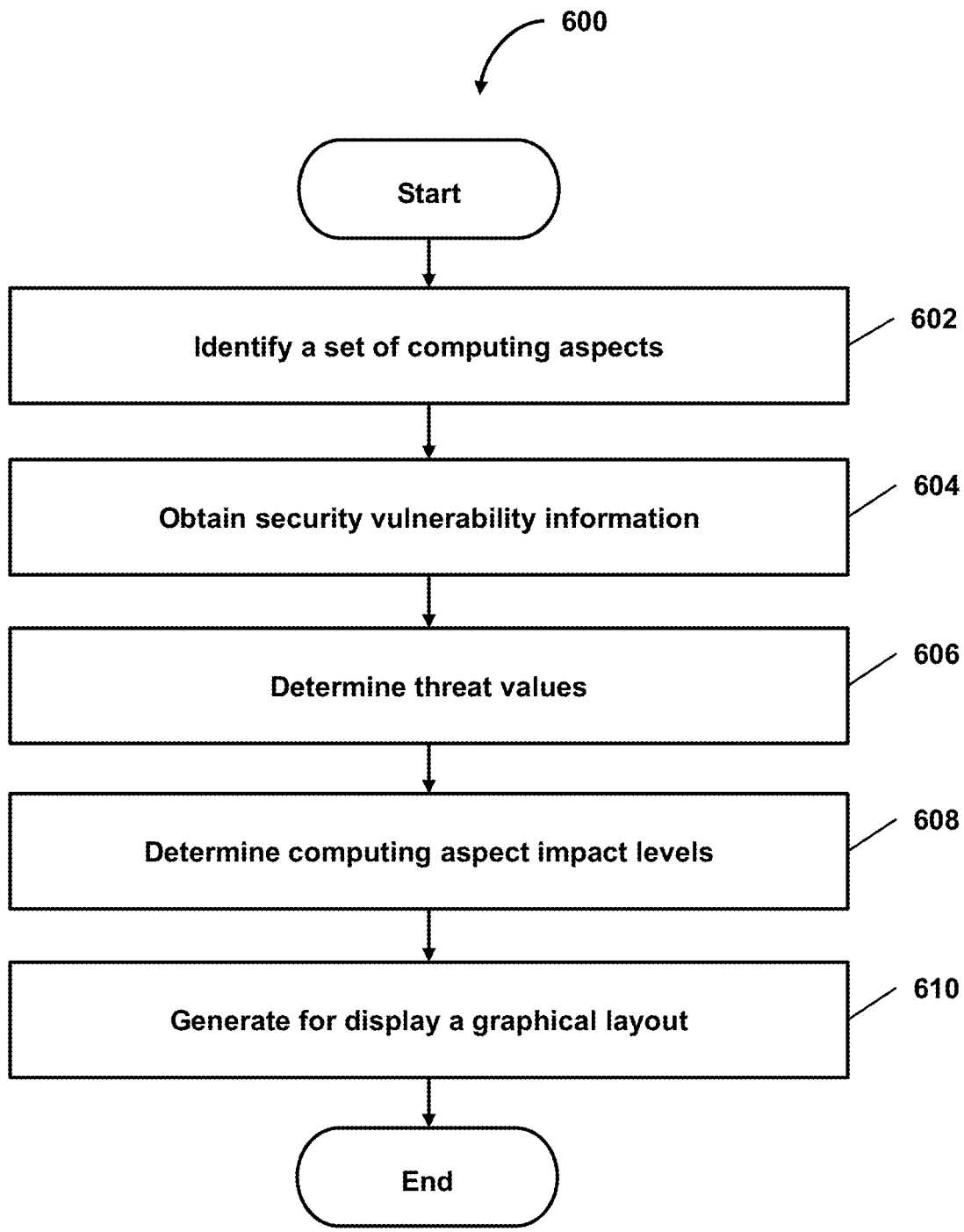
FIG. 6 is a flow diagram illustrating a process of determining platform-specific end-to-end security vulnerabilities for a software application via a Graphical User Interface (GUI), in accordance with some implementations of the present technology.

Determining Platform-Specific End-to-End Security Vulnerabilities for a Software Application FIG. 6 is a flow diagram illustrating a process of determining software platform-specific end-to-end security vulnerabilities, in accordance with some implementations of the present technology.

At act 602, process 600 can identify a set of computing aspects. For example, process 600 can identify a set of computing aspects associated with a software platform. To identify such computing aspects, process 600 can use a computing-aspect-mapping structure. The computing-aspect-mapping structure can indicate a mapping of platforms to computing aspects involved with a processing of network operations. A platform can be an ecosystem of computing resources within which a software application executes. For instance, a platform may be a cloud-based platform (e.g., Amazon Web Services®, Microsoft Azure®, Google Cloud®, or other cloud-based platforms), a mobile operating system platform (e.g., iPhone Operating System®, Android®, iPad Operating System®, Watch Operating System®, Windows Mobile Operating System®, Blackberry Operating System®, or other mobile operating system platforms), or other third-party hosted cloud or non-cloud based platforms. Each platform can be associated with an identifier (e.g., an alphanumeric string, a numeric identifier, such as an integer, one or more values, or other identifier that uniquely identifies the respective platform). Additionally, the computing-aspect-mapping structure can map each platform (e.g., platform identifier) to one or more computing aspects involved with a processing of network operations. For instance, the computing aspects can represent assessment-domains which may indicate one or more categories of computing processes involved with processing of a network operation. As an example, an assessment domain can represent a computing aspect of "Platform Usage" (e.g., indicating the overall security of the platform), a computing aspect of "Data Storage" (e.g., indicating the overall security of data storage related computing components), a computing aspect of "Network" (e.g., indicating the overall security of network communications), or a computing aspect of "Cryptography" (e.g., indicating the overall security of cryptographic processes or cryptographic communications). Therefore, such assessment-domains may indicate overall categories to be assessed with respect to a platform, such that the assessment-domains are (i) specific to the platform (e.g., as differing platforms may be associated with different assessment-domains and/or computing aspects) and (ii) represent an overall assessment of each computing hardware component and software component involved with the platform(s) to which the software application is associated with. As each platform can be associated with one or more hardware components and software components (e.g., software applications) being executed on each hardware component, the assessment-domains may indicate categories to be assessed when determining the overall security of a software application being executed on a given platform. It should be noted, that in some implementations, "assessment-domains" can be used interchangeably with "computing aspects," unless the context clearly indicates otherwise.

For example, when a user is interacting with a mobile application on a user device, the mobile application can be connected (e.g., via a network, such as the Internet) to one or more back-end servers to execute a request (e.g., a network operation). However, to execute a request, there may exist a multitude of computing components that the request must "pass through" to accomplish execution of the request. Such computing components may include, but are not limited to, firewalls, load balancers, servers, databases, or other computer-networking architecture components. Each of the computing components may be associated with their own respective security vulnerabilities. For instance, a server may be prone to a data breach if there is a known "back door" security vulnerability associated with the server, whereas a firewall may be prone to a man-in-the-middle attack. As such, each computing component may be evaluated independently, or in combination with one another to determine how secure the mobile application is.

Existing systems currently evaluate each computing component based on hardware identifying information, such as serial numbers, and evaluate any software being executed on the hardware via software versioning identifiers, while providing such information to a third-party to obtain relevant security threats. However, these threats are often complex and may or may not impact the overall operation of a given software application being executed on a platform (or the type of data that the software application handles). Moreover, such threats may not be specific to a platform as such threat information is often extremely generic. For example, the threats may be based on (i) the software application, (ii) information that the software application handles, and (iii) the platform to which the software application is hosted on (or otherwise associated with). For instance, a given software application may handle both sensitive and non-sensitive data. However, due to the generic nature of the information obtained from the third-party regarding the security threats related to the software application, the third-party may only provide threat information that is related to the non-sensitive data handling aspect of the software application which may lead to a data breach of sensitive user information. Additionally, the third-party may only provide threat information irrespective of the platform, where there may exist one or more security vulnerabilities that are directly related to the platform. To overcome this, the computing-aspect-mapping structure can include predefined computing aspects (e.g., assessment domains, such as cryptography, data storage, platform usage, networking, or other computing aspects) that are specific to a given platform, thereby enabling an end-user to easily identify whether a software application is secure or otherwise safe to use without the complex jargon of cybersecurity threat information.

In some implementations, process 600 can determine a platform associated with a software application. For example, process 600 can retrieve information related to the software application, such as a version identifier of the software application, operating system requirements of the software application, component identifier (e.g., hosting the software application), component serial number (e.g., hosting the software application), or other information associated with the software application. For instance, by using a component identifier, process 600 may determine from a database a platform associated with the software application. Using such information, process 600 can determine the platform that is associated with the software application.

In one use case, where the user is interacting with a software application on a user device, process 600 can retrieve a software version identifier and an operating system identifier of the user device. Process 600 may then compare the software version identifier and the operating system identifier of the user device to table indicating one or more platforms that are associated with the software application. For instance, as a given software application may be specific to a given platform (e.g., can only be executed on a particular platform, can be executed on a multitude of platforms, etc.), process 600 can retrieve a platform identifier from the table to determine the platform that is associated with the software application. In other implementations, process 600 can perform a search engine-query to determine a platform associated with the software application (e.g., using the software version identifier and the operating system identifier of the user device). In some implementations, process 600 can determine the platform associated with the software application by using a predetermined list of platform identifiers that are associated with an entity. For example, the entity may be a service provider, company, corporation, merchant, or other entity that is associated with the software application (e.g., an entity that controls the software application, that developed the software application, or otherwise provides the software application). The entity that is associated with the software application may have the most accurate knowledge on which platform the software application is executed on or which platforms the software application interacts with, in which process 600 can determine the platform associated with the software application more accurately than other methods.

In some implementations, the computing-aspect-mapping structure can be generated by a machine learning model. For example, as discussed in relation to FIG. 4, a machine learning model can generate the computing-aspect-mapping structure by using (i) information related to the software platform (e.g., the platform in which the software application is being executed on, or is associated with), and (ii) third-party entity security vulnerability information. In this way, the system dynamically generates the most up to date computing-aspect-mapping structures where security vulnerability information changes. By doing so, the user experience is improved by ensuring that the user is made aware of the most prevalent security vulnerabilities associated with the software application the user is interacting with.

At act 604, process 600 can obtain security vulnerability information. For example, process 600 can obtain a set of security-vulnerability descriptions indicating security threats associated with the platform. For example, process 600 can obtain the set of security-vulnerability descriptions from a security entity. The security entity, as discussed above, can be a security entity providing information pertaining to observed security vulnerabilities associated with computing components, such as hardware and software. In some implementations, the security entity can be an in-house security entity. For example, an in-house security entity may be the same or similar entity to which is associated with the software application. For example, the in-house security entity may be the same entity that controls the software application, that developed the software application, or otherwise provides the software application. Such in-house security entity may host a database of security vulnerabilities associated with software applications and/or platforms they control, develop, or provide. In some implementations, the security entity can be a third-party security entity. For example, a third-party security entity can be an entity that may not control, develop, or provide the software application, but observe security vulnerabilities within a multitude of software applications, platforms, or other computing components. As an example, third-party security entities may be Mitre®, NIST®, or other industry standard or trusted security entities. Such security entities can provide security-vulnerability descriptions that each indicate one or more security threats, attack vectors, TTPs, security-vulnerability responses, or other security-vulnerability-related information pertaining to one or more computing components and/or computing aspects associated with the one or more computing components.

In some implementations, the set of security-vulnerability descriptions can each be associated with one or more computing aspects involved with a processing of network operations. For example, as each security-vulnerability description is associated with a platform, process 600 can use the computing-aspect-mapping structure to further associate (or otherwise generate associations between) each security-vulnerability description with a respective computing aspect based on the platform. For instance, using a platform identifier, process 600 can parse through the computing-aspect-mapping structure to determine a match between a platform identifier of a security vulnerability description and a platform identifier of the computing-aspect-mapping structure. In response to a match between the platform identifier of the security vulnerability description and the platform identifier of the computing-aspect-mapping structure, process 600 can determine a match between a computing aspect identifier of the security vulnerability description and the computing aspect identifier of the computing-aspect-mapping structure. In response to a match between the computing aspect identifier of the security vulnerability description and the computing aspect identifier of the computing-aspect-mapping structure, process 600 can associate (e.g., populate, add to, concatenate, link, generate, etc.) the security vulnerability description to the computing-aspect-mapping structure with respect to the platform identifier and the computing aspect defined in the computing-aspect-mapping structure. In this way, process 600 can provide an enhanced computing-aspect-mapping structure that encompasses not only which computing aspects are involved with a platform, but also the relevant security vulnerabilities associated with the computing aspects of the platform.

In some implementations, the computing-aspect-mapping structure can be a predetermined computing-aspect-mapping structure including information related to (i) the platform, (ii) security vulnerabilities associated with the platform, and (iii) computing aspects associated with the respective platform and security vulnerabilities. For example, the predetermined computing-aspect-mapping structure can be a predetermined data structure created by one or more software developers. In this way, the system reduces the amount of computing processing resources and computer memory required to generate a dynamic computing-aspect-mapping structure. In other implementations, as discussed in relation to FIG. 4, the computing-aspect-mapping structure can be a machine learning model generated computing-aspect-mapping structure. In this way, the system provides an enhanced computing-aspect-mapping structure that is up-to-date with the most current security vulnerabilities, thereby improving the user experience.

At act 606, process 600 can determine threat values. For example, process 600 can determine a threat value of each security-vulnerability description of the set of security-vulnerability descriptions. In some implementations, process 600 can determine a threat value of each security-vulnerability description of the set of security vulnerability descriptions by using a platform-specific policy. For example, the platform-specific policy can indicate information related to the platform and the handling of threats associated with the given platform. The platform-specific policy can be a governing document created, managed, or controlled by the entity providing the software application (e.g., to which determining the security of the software application is based on). For example, the platform-specific policy may act as a governing document for a particular computing platform of the entity that is associated with the handling of one or more threats, threat values, residual risk values, or threat mitigation values. The platform-specific policy can include information such as predetermined threat values for a given security vulnerability description with respect to a platform, a given security vulnerability response with respect to a platform, a given TTP with respect to a platform, one or more computing aspects associated with the platform, or other values associated with security vulnerability-related information. For example, the platform-specific policy can include a mapping of security-vulnerability responses mapped to a respective threat level. Such threat levels (e.g., of the platform-specific policy) may indicate a quantitative or qualitative value indicating how "big" of a threat a given security vulnerability is. For instance, with respect to a cloud-based platform, a security vulnerability associated with a man-in-the-middle attack between a computing network and a server of the cloud-based platform may be mapped to a threat value of 10 (e.g., on a scale of 0-10, with 0 being the lowest threat level, and 10 being the highest threat level).

In some implementations, process 600 can determine threat values for each security-vulnerability description of the set of security-vulnerability descriptions by using a machine learning model. For example, as described in relation to FIG. 4, in some implementations, process 600 can provide platform identifiers (e.g., the platform that a software application is being executed on, or associated with), the set of security vulnerability descriptions, the one or more computing aspects associated with each of the security vulnerability descriptions, the platform-specific policy, or other information as input to the machine learning model. The machine learning model can output a set of threat values, where each threat value of the set of threat values are associated with a respective security-vulnerability description. As the machine learning model can generate predictions of the threat values with respect to the security vulnerabilities, process 600 provides an enhanced method for determining such threat values in scenarios where the platform-specific policy may not provide direct guidance of what a threat value is for a security-vulnerability description. In this way, process 600 can generate threat values for security-vulnerability descriptions that may not be defined in the platform-specific policy, thereby improving the user experience as unknown security-vulnerabilities that may be present (e.g., due to an update of security-vulnerability descriptions) may be associated with a threat value.

At act 606, process 600 can determine computing aspect impact levels. For example, process 600 can determine a computing aspect impact level for each computing aspect of the set of computing aspects associated with the platform using the determined threat value for each security-vulnerability description. For instance, as discussed in act 606, upon determining a threat value for each security-vulnerability description, process 600 can use the threat values to determine a computing aspect impact level for each computing aspect of the set of computing aspects associated with the platform. The computing aspect impact level can represent an "overall," "combined," "normalized," or other threat level with respect to a given computing aspect that is associated with the software application hosted on a respective platform. For example, as discussed above, to determine how secure or safe a given software application is, the platform that hosts the software application and other platforms that interact with the software application can be analyzed to determine what security vulnerabilities exist. For an end-user, determining whether the software application is secure (or safe to use) may be difficult to the complex cybersecurity jargon associated with security vulnerability descriptions. Thus, to generate an easily understood software security label for a software application, process 600 can determine, for each computing aspect associated with the platform that the software application is hosted on or interacts with, a computing aspect impact level. As opposed to existing systems merely providing users with the security vulnerability descriptions themselves in an unorganized format, process 600 can generate computing aspect impact levels for each computing aspect of the set of computing aspects associated with the platforms and subsequently generate a graphical user interface displaying such information to enable users to quickly and easily identify how secure a software application is.

To accomplish this, process 600 can aggregate each threat level corresponding to a respective computing aspect of the set of computing aspects associated with the platform and generate a computing aspect impact level for each computing aspect of the set of computing aspects associated with the platform. In some implementations, process 600 can use an industry standard risk assessment and/or scoring standard to generate the computing aspect impact level. For example, process 600 can use a Common Vulnerability Scoring System (CVSS) to generate a qualitative measure of severity of the security vulnerability descriptions with respect to a given computing aspect. As another example, process 600 can use the CVSS to generate a quantitative measure of severity of the security vulnerability descriptions with respect to a given computing aspect. In some implementations, process 600 can, for each computing aspect of the set of computing aspects, compute an average of each threat value corresponding to a security vulnerability description to generate the respective computing aspect impact levels. In other implementations, process 600 can, for each computing aspect of the set of computing aspects, compute a weighted average or a weighted sum of each threat value corresponding to a security vulnerability description to generate the respective computing aspect impact levels. In some implementations, the weights (e.g., of the weighted sum or the weighted average) can be predetermined weights that are respective to a given computing aspect and/or security vulnerability description. Additionally, in some implementations, process 600 can generate the computing aspect impact levels by identifying, for a given computing aspect, the highest generated threat level corresponding to a security-vulnerability description and use the highest generated threat level as the computing aspect impact level. It should be noted, that the computing aspect impact levels can represent a quantitative value or a qualitative value that can be normalized on a respective scale. In this way, by generating a computing aspect impact level for each computing aspect of the set of computing aspects associated with the platform, process 600 provides an easily understood metric to enable end-users to quickly identify whether a software application they are interacting with is secure or otherwise safe to use, thereby improving the user experience.

At act 610, process 600 can generate for display a graphical layout. For example, as discussed above, to provide a user, whether it be an end-user such as a customer or a software developer, an easily understood software security label for a given software application, process 600 can generate for display at a graphical user interface (GUI), a graphical layout indicating computing-aspect-specific impact levels. For example, the graphical layout may include a information pertaining to the software application, including, but not limited to a graphical representation of each computing aspect impact level of each respective computing aspect of the set of computing aspects associated with the platform, a platform identifier, computing aspect identifiers, graphical representations of mitigated computing aspect impact levels of each respective computing aspect of the set of computing aspects, a key or legend, or other information.

Figure 7:
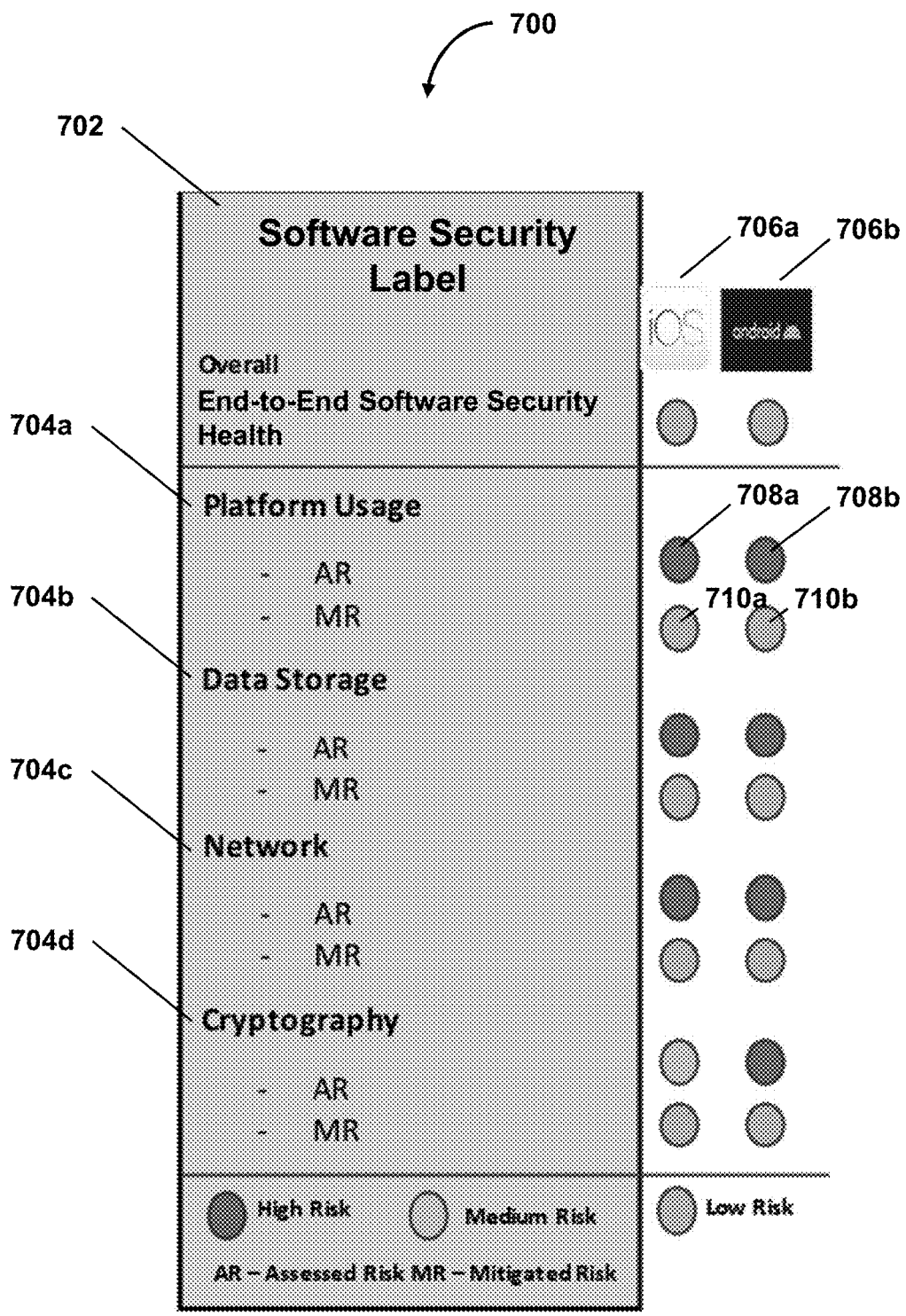
FIG. 7 shows an illustrative representation of a graphical layout for displaying platform-specific end-to-end security vulnerabilities for a software application via a GUI, in accordance with some implementations of the present technology.

Referring to FIG. 7, FIG. 7 shows an illustrative representation of a graphical layout for displaying platform-specific end-to-end security vulnerabilities for a software application via a GUI, in accordance with some implementations of the present technology. For example, software security label 700 can include a software security label identifier 702, computing aspect identifiers 704a-d, platform identifiers 706a-b, and computing aspect impact level representations 708a-b. The software security label identifier 702 can convey information to a user that the user is viewing a software security label. Computing aspect identifiers 704a-d may indicate the respective computing aspects that are associated with the platform that hosts the software application. For example, the computing aspect identifiers 704a-d may be the same or similar to the computing aspects as determined in act 602. Additionally, platform identifiers 706a-b may be the same or similar to the platforms as determined in act 602. Computing aspect impact level representations 708a-b may indicate a graphical representation of the determined computing aspect impact levels as determined in act 608. As shown, computing aspect impact level representations 708a-b may indicate a qualitative graphical representation of a respective computing aspect impact level as determined in act 608. For example, although FIG. 7 shows the computing aspect impact level representations 708a-b as color coded shapes, other graphical representations may be used in accordance with some implementations of the present technology, such as, but not limited to, numerical values (e.g., integers, decimals, percentages, ratios, etc.), alphanumeric strings (e.g., "high," "medium," "low," etc.), hexadecimal values, binary values, or other graphical representations of the computing aspect impact levels.

In some implementations, the graphical representations of the computing aspect impact levels can be predetermined. For example, with respect to a given computing aspect impact level, a graphical representation of the computing aspect impact level can correspond to a respective computing aspect impact level as determined in act 608. For instance, where the computing aspect impact levels are normalized on a scale of 0-100, 0-33 may correspond to a green shape indicating a "low" impact, 34-66 may correspond to a yellow shape indicating a "medium" impact, and 67-100 may correspond to a red shape indicating a "high" impact. In this way, by providing a graphical representation of each computing aspect impact level of the set of computing aspect impact levels, a user is enabled to quickly identify which "area" or computing aspect of a software application the user is, or may, interact with is affected (e.g., by a security vulnerability). As such, by being able to quickly identify which computing aspects of a software application may secure or unsecure (e.g., due to one or more security vulnerabilities), process 600 improves the user experience by aiding the user to make better decisions on whether or not to use a given software application, thereby decreasing the chance of any potential user data leak.

In some implementations, the software security label 700 can be interactive. For example, although a user-friendly, formatted, graphical user interface is provided to enable users to determine the security of a software application, some users may want to learn more about how a given computing aspect impact level is determined. For instance, a user may want to determine reasons why "platform usage" is a high risk computing aspect. As such, in some implementations, the software security label 700 can be interactive enabling a user to select one or more graphical elements (e.g., software security label identifier 702, computing aspect identifiers 704a-d, platform identifiers 706a-b, and computing aspect impact level representations 708a-b, or other graphical elements) of the software security label 700. For example, computing aspect impact level representations 708a-b can be user-selectable. Upon a user selection of a computing aspect impact level representation 708a-b, an updated user interface may be presented to the user that may include additional information not shown in FIG. 7, such as, but not limited to, the computing aspect impact level (e.g., as a quantitative or qualitative value), one or more security vulnerabilities associated with the selected computing aspect impact level representation, one or more computing components or software components associated with the platform that is further associated with the computing aspect impact level (e.g., an indication of the software/hardware components causing the computing aspect impact level to be determined as is), security vulnerability details (e.g., type of vulnerability, attack vector of the vulnerability, date of discovery, system-provided comments related to the security vulnerability, assessment stage, etc.), inherent risks associated with the computing aspect impact level representation, residual risks associated with the computing aspect impact level representation, mitigation measures associated with the computing aspect, or other information that may be associated with the selected graphical element.

In some implementations, process 600 can update the graphical layout to include high-impact computing-aspect-specific impact levels. For example, to improve the user experience, process 600 can update the graphical layout to include a graphical representation of high-impact computing aspects of the set of computing aspect impact levels. That is, as opposed to generating a graphical representation of each computing aspect impact level, process 600 can update the graphical layout to include only the "highest" impacted computing aspects associated with the platform to aid the user in making a quick determination regarding the security of the software application. As such, process 600 can determine a set of high-impact computing aspects responsive to a respective computing aspect impact level exceeding a predetermined threshold value for the respective computing aspect. For example, each computing aspect can be associated with a predetermined threshold value to be indicated as a high-impact computing aspect. For instance, the computing aspect of "cryptography" may be associated with a predetermined threshold value of 7 (e.g., on a scale 0-10, with 0 indicating the lowest level of impact and 10 indicating the highest level of impact). Process 600 can compare each computing aspect impact level to the respective predetermined threshold value for the computing aspect. In response to the comparison indicating the computing aspect impact level meets or exceeds the predetermined threshold value for the respective computing aspect, process 600 can determine that the respective computing aspect is a high-impact computing aspect. Upon determining which computing aspects are high-impact computing aspects, process 600 can then update the graphical layout to only include a graphical representation of each high-impact computing aspects of the set of high-impact computing aspects and a graphical representation of the respective high-impact computing aspect impact level. The high-impact computing aspect impact level may be the same or similar to the computing aspect impact levels as determined in act 608, however, the updated graphical representation may only include the high-impact computing aspects to enable a user to quickly identify which computing aspects of a given software application are most impacted by one or more security vulnerabilities.

In some implementations, process 600 can determine a mitigated-computing-aspect impact level for each computing aspect of the set of computing aspects related to the platform. For instance, as an entity may employ one or more system protection measures (e.g., such as firewalls, software updates, hardware updates, cybersecurity hardware/software, etc.) to protect the entity's system or software application from cybersecurity threats, one or more security vulnerabilities as identified by a security entity may not impact the entity's system (e.g., due to the system protection measures). As such, to enable the user to see how a given entity is proactive in ensuring that their software application is indeed safe to use via their own system security measures or protocols, process 600 may determine mitigated-computing-aspect impact levels for each computing aspect of the set of computing aspects related to the platform.

Referring to FIG. 7, FIG. 7 shows a graphical representation of mitigated-computing-aspect impact levels 710*a-b* for a respective software application. For example, with respect to the computing aspect of platform usage 704*a*, for the platform 706*a* indicating iPhone Operating System®, FIG. 7 shows a graphical representation of computing aspect impact level 708*a* and a graphical representation of mitigated-computing-aspect-impact level 710*a*. In this example, the graphical representation of computing aspect impact level 708*a* is shown as a red shape indicating that there is a high impact of security vulnerabilities in relation to the platform usage. However, the graphical representation of mitigated-computing-aspect-impact level 710*a* is shown as a green shape indicating that there is a low impact of security vulnerabilities in relation to the platform usage. Due to the system protection measures in place by the entity with respect to the platform usage, the computing aspect impact level has changed or otherwise is "mitigated." In this way, the user is enabled to easily identify and be notified that the entity is employing techniques to ensure that their software application is secure and safe to use.

To determine the mitigated-computing-aspect impact levels for each computing aspect, process 600 can determine, for each security-vulnerability description, a system protection measure corresponding to a respective security-vulnerability description. For example, in some implementations, the entity providing the software application may store a data structure that is accessible to determine which system protection measures are in place to overcome one or more security vulnerabilities as identified by the security entity in act 604. For example, the data structure can be a table, graph, directed graph, array, or other data structure configured to include information related to platforms, the system protection measures associated with the platforms, mitigated-threat-offset-values, mitigated-threat values, security vulnerability descriptions, computing aspects, or other information. In some implementations, multiple data structures can exist where each data structure corresponds to a given platform. For instance, a first data structure can be related to a cloud-based platform, and may include mappings of a security vulnerability descriptions related to the platform to (i) one or more system protection measures of the platform and (ii) a mitigated threat value corresponding to the system protection measure. In this way, each mitigated threat value (e.g., predetermined mitigated threat values) is directly associated with a system protection measure affecting a respective security vulnerability of a specific platform. Each mitigated threat value may indicate a level of system protection with respect to a security-vulnerability. For instance, in some implementations, mitigated-threat offset value may act as an "offset" value, a weight, a percentage, or other value that may have an effect on a threat value of a security-vulnerability description. For instance, the data structure can indicate, that for a respective system protection measure corresponding to a security-vulnerability description of a given platform, a mitigated-threat-offset-value. In such an example, the mitigated-treat-offset-value may be 0.5, 0.4, 0.3, 0.2, 0.1. In this way, the mitigated-threat-offset-value may be multiplied to a threat value of the security vulnerability description (e.g., as obtained in act 606) to determine a mitigated threat value. In some implementations, upon determining a mitigated threat value for each computing aspect of the set of computing aspects related to the platform, the system can determine a mitigated-computing-aspect impact level for a given computing aspect by computing a weighted average of mitigated threat values with respect to the given computing aspect. In other implementations, process 600 can determine a mitigated-computing-aspect impact level for a given computing aspect by computing a weighted sum of mitigated threat value with respect to the given computing aspect.

In some implementations, process 600 can determine mitigated-computing-aspect impact levels for each computing aspect of the set of computing aspects related to the platform based on a machine learning model. For example, referring to FIG. 4, process 600 can provide platform identifiers, security vulnerability descriptions, one or more computing aspects, a platform-specific policy, one or more impact level measures, system protection measure information, mitigated threat values, or other information to a machine learning model to generate predictions related to mitigated-computing-aspect impact levels for each computing aspect of the set of computing aspects associated with the platform. In this way, process 600 can generate accurate mitigated-computing-aspect impact levels where one or more mitigated threat values or system protection measures are unknown, thereby improving the user experience.

In some implementations, process 600 can generate a graphical representation of the mitigated-computing-aspect impact levels to be displayed in a graphical user interface. For example, referring back to FIG. 7, as discussed above, process 600 can generate a graphical representation for each mitigated-computing-aspect impact level for each computing aspect of the set of computing aspects related to the platform. For example, process 600 can generate a graphical representation for each mitigated-computing-aspect impact level in a manner similar to that of act 610, where as opposed to using the computing aspect impact levels as determined in act 608, process 600 can may the mitigated-computing-aspect impact levels as determined above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for determining platform-specific end-to-end security vulnerabilities for software applications via a graphical user interface (GUI), the system comprising:
   at least one processor; and
   at least one memory coupled to the at least one processor and storing instructions that, when executed by the at least one processor, perform operations comprising:
      determining a platform associated with a software application, wherein the platform indicates an ecosystem of computing resources within which the software application executes;
      using the determined platform associated with the software application, identifying a set of assessment-domains by comparing a platform identifier of the platform to an assessment-domain-mapping data structure, wherein the assessment-domain-mapping data structure indicates a mapping of one or more platform identifiers to one or more assessment-domains;
      obtaining, from a third-party security entity, a set of security-vulnerability responses, wherein each response of the set of security-vulnerability responses indicate at least one security threat associated with a respective assessment domain;
      assigning a threat value to each security-vulnerability response of the set of security-vulnerability responses by comparing a respective security-vulnerability response to a platform-specific policy, wherein the platform-specific policy includes a mapping of security-vulnerability responses to a predetermined respective threat level that is specific to one or more assessment-domains associated with a respective platform;

determining, an assessment-domain impact level for each assessment-domain of the set of assessment-domains related to the platform, by computing a weighted average of assigned threat values of the respective assessment-domain; and generating for display at the GUI, a graphical layout indicating assessment-domain-specific impact levels, wherein the graphical layout includes a graphical representation of each assessment-domain of the set of assessment-domains and a graphical representation of the respective assessment-domain impact level.

2. The system of claim 1, wherein the instructions when executed by the at least one processor further perform operations comprising:

determining a set of high-impact assessment domains responsive to a respective assessment-domain impact level of a respective assessment-domain exceeding a predetermined threshold value for the respective assessment-domain; and updating the graphical layout indicating the assessment-domain-specific impact levels to only include a graphical representation of each high-impact assessment-domains of the set of high-impact assessment-domains and a graphical representation of the respective high-impact assessment-domain impact level.

3. The system of claim 1, wherein the instructions when executed by the at least one processor further perform operations comprising:

determining, for each security-vulnerability response, a system protection mechanism corresponding to the respective security-vulnerability response;

determining, based on the system protection mechanism corresponding to a given security-vulnerability response, a mitigated threat value, wherein the mitigated threat value indicates a level of system protection with respect to a security-vulnerability; and determining a mitigated-assessment domain impact level for each assessment domain of the set of assessment domains related to the platform using the mitigated threat values.

4. The system of claim 3, wherein the mitigated-assessment domain impact level for each assessment domain of the set of assessment domains is further determined by:

computing a weighted average of mitigated threat values with respect to a given assessment domain; and determining the mitigated-assessment domain impact level for the given assessment domain based on the weighted average of mitigated threat values.

5. A computer-implemented method for determining platform-specific end-to-end security vulnerabilities for software platforms via a graphical user interface (GUI), the method comprising:

identifying a set of computing aspects associated with a software platform using a computing-aspect-mapping structure, wherein the computing-aspect-mapping structure indicates a mapping of platforms to computing aspects involved with a processing of network operations;

obtaining, from a security entity, a set of security-vulnerability descriptions, wherein each description of the set of security-vulnerability descriptions indicate security threats associated with the platform;

determining a threat value of each security-vulnerability description of the set of security-vulnerability descriptions by using a platform-specific policy, wherein the platform-specific policy indicates (i) security impact information related to security-vulnerability descriptions and (ii) a mapping of security-vulnerability descriptions to predetermined security threat values that are specific to one or more computing aspects associated with a respective platform;

determining a computing aspect impact level for each computing aspect of the set of computing aspects associated with the platform using the determined threat value for each security-vulnerability description; and generating for display at a graphical user interface, a graphical layout indicating computing-aspect-specific impact levels, wherein the graphical layout comprises a graphical representation of each computing aspect impact level of each respective computing aspect of the set of computing aspects associated with the platform.

6. The method of claim 5, further comprising:

determining a set of high-impact computing aspects responsive to a respective computing aspect impact level of a respective computing aspect exceeding a predetermined threshold value for the respective computing aspect; and updating the graphical layout indicating the computing-aspect-specific impact levels to only include a graphical representation of each high-impact computing aspects of the set of high-impact computing aspects and a graphical representation of the respective high-impact computing aspect impact level.

7. The method of claim 5, further comprising:

determining, for each security-vulnerability description, a system protection measure corresponding to a respective security-vulnerability description;

determining, based on the system protection measure corresponding to a given security-vulnerability description, a mitigated threat value, wherein the mitigated threat value indicates a level of system protection with respect to a security-vulnerability; and determining a mitigated-computing-aspect impact level for each computing aspect of the set of computing aspects related to the platform using the mitigated threat values.

8. The method of claim 7, wherein the mitigated-computing-aspect impact level for each computing aspect of the set of computing aspects is further determined by:

computing a weighted average of mitigated threat values with respect to a given computing aspect; and determining the mitigated-computing-aspect impact level for the given computing aspect based on the weighted average of mitigated threat values.

9. The method of claim 7, wherein the mitigated-computing-aspect impact level for each computing aspect of the set of computing aspects is further determined by:

computing a weighted sum of mitigated threat values with respect to a given computing aspect; and determining the mitigated-computing-aspect impact level for the given computing aspect based on the weighted sum of mitigated threat values.

10. The method of claim 5, wherein determining the threat value of each security-vulnerability description of the set of security-vulnerability descriptions further comprises:

applying a machine learning model to generate the threat value of each security-vulnerability description of the set of security-vulnerability descriptions by using (i) platform-specific policy information and (ii) the set of security-vulnerability descriptions.

11. The method of claim 5, further comprising:
applying a machine learning model to generate the computing-aspect-mapping structure using (i) information related to the software platform and (ii) third-party entity security vulnerability information, wherein the computing-aspect-mapping structure maps the security vulnerability information from the third-party entity to computing aspects associated with the software platform.

12. One or more non-transitory computer-readable media comprising instructions that, when executed by one or more processors, cause operations comprising:
identifying a set of computing aspects associated with a software platform using a computing-aspect-mapping structure, wherein the computing-aspect-mapping structure indicates a mapping of platforms to computing aspects involved with a processing of network operations;
obtaining, from a security entity, a set of security-vulnerability descriptions, wherein each description of the set of security-vulnerability descriptions indicate security threats associated with the platform;
determining a threat value of each security-vulnerability description of the set of security-vulnerability descriptions by using a platform-specific policy, wherein the platform-specific policy indicates (i) security impact information related to security-vulnerability descriptions and (ii) a mapping of security-vulnerability descriptions to predetermined security threat values that are specific to one or more computing aspects associated with a respective platform;
determining a computing aspect impact level for each computing aspect of the set of computing aspects associated with the platform using the determined threat value for each security-vulnerability description; and
generating for display at a graphical user interface, a graphical layout indicating computing-aspect-specific impact levels, wherein the graphical layout comprises a graphical representation of each computing aspect impact level of each respective computing aspect of the set of computing aspects associated with the platform.

13. The media of claim 12, wherein the operations further comprise:
determining a set of high-impact computing aspects responsive to a respective computing aspect impact level of a respective computing aspect exceeding a predetermined threshold value for the respective computing aspect; and
updating the graphical layout indicating the computing-aspect-specific impact levels to only include a graphical representation of each high-impact computing aspects of the set of high-impact computing aspects and a graphical representation of the respective high-impact computing aspect impact level.

14. The media of claim 12, wherein the operations further comprise:
determining, for each security-vulnerability description, a system protection measure corresponding to a respective security-vulnerability response;
determining, based on the system protection measure corresponding to a given security-vulnerability description, a mitigated threat value, wherein the mitigated threat value indicates a level of system protection with respect to a security-vulnerability; and
determining a mitigated-computing-aspect impact level for each computing aspect of the set of computing aspects related to the platform using the mitigated threat values.

15. The media of claim 14, wherein the mitigated-computing-aspect impact level for each computing aspect of the set of computing aspects is further determined by:
computing a weighted average of mitigated threat values with respect to a given computing aspect; and
determining the mitigated-computing-aspect impact level for the given computing aspect based on the weighted average of mitigated threat values.

16. The media of claim 14, wherein the mitigated-computing-aspect impact level for each computing aspect of the set of computing aspects is further determined by:
computing a weighted sum of mitigated threat values with respect to a given computing aspect; and
determining the mitigated-computing-aspect impact level for the given computing aspect based on the weighted sum of mitigated threat values.

17. The media of claim 12, wherein determining the threat value of each security-vulnerability description of the set of security-vulnerability descriptions further comprises:
applying a machine learning model to generate the threat value of each security-vulnerability description of the set of security-vulnerability descriptions by using (i) platform-specific policy information and (ii) the set of security-vulnerability descriptions.

18. The media of claim 12, wherein the operations further comprise:
applying a machine learning model to generate the computing-aspect-mapping structure using (i) information related to the software platform and (ii) third-party entity security vulnerability information, wherein the computing-aspect-mapping structure maps the security vulnerability information from the third-party entity to computing aspects associated with the software platform.

* * * * *